United States Patent
Latimer et al.

(10) Patent No.: US 8,430,947 B2
(45) Date of Patent: **\*Apr. 30, 2013**

(54) WATER RECOVERY FROM STEAM-ASSISTED PRODUCTION

(75) Inventors: Edward G. Latimer, Ponca City, OK (US); Christopher R. Copeland, Bartlesville, OK (US); Ryan K. Davis, Bartlesville, OK (US); James Scinta, Bartlesville, OK (US); Dale L. Embry, Houston, TX (US); David C. Lamont, Calgary (CA); Charles J. Murray, Pasadena, TX (US); Ryan D. Donahe, Missouri City, TX (US)

(73) Assignee: ConocoPhillips Company, Houston, TX (US)

( \* ) Notice: Subject to any disclaimer, the term of this patent is extended or adjusted under 35 U.S.C. 154(b) by 332 days.

This patent is subject to a terminal disclaimer.

(21) Appl. No.: 12/835,494

(22) Filed: Jul. 13, 2010

(65) Prior Publication Data

US 2011/0011559 A1 Jan. 20, 2011

Related U.S. Application Data

(60) Provisional application No. 61/226,523, filed on Jul. 17, 2009.

(51) Int. Cl.
*B01D 53/14* (2006.01)
*B01D 53/74* (2006.01)
*B01D 5/00* (2006.01)

(52) U.S. Cl.
USPC ............ 95/158; 95/228; 95/235; 95/288; 95/258; 95/259; 95/253

(58) Field of Classification Search .................... 165/59, 165/60, 48.1; 423/242.1, 243.01, 244.01; 62/617; 95/288, 235, 227, 228, 229, 258, 95/259, 253, 158
See application file for complete search history.

(56) References Cited

U.S. PATENT DOCUMENTS

| | | | |
|---|---|---|---|
| 3,999,329 A * | 12/1976 | Brais | 47/17 |
| 4,208,383 A * | 6/1980 | Kisters et al. | 423/215.5 |
| 4,799,941 A | 1/1989 | Westermark | |
| 5,753,012 A * | 5/1998 | Firnhaber et al. | 95/65 |
| 5,843,214 A | 12/1998 | Janes | |
| 6,449,954 B2 | 9/2002 | Bachmann | |
| 6,907,845 B2 | 6/2005 | Krebs | |
| 7,066,396 B2 | 6/2006 | Knight et al. | |
| 7,194,869 B2 | 3/2007 | McQuiggan | |
| 7,341,102 B2 * | 3/2008 | Kresnyak et al. | 166/267 |
| 7,390,353 B2 * | 6/2008 | Deen et al. | 96/242 |
| 7,690,201 B2 * | 4/2010 | Kravets | 60/653 |
| 7,820,726 B2 * | 10/2010 | Rigby et al. | 518/700 |
| 2011/0067610 A1 * | 3/2011 | Latimer et al. | 110/342 |

* cited by examiner

*Primary Examiner* — Duane Smith
*Assistant Examiner* — Ives Wu
(74) *Attorney, Agent, or Firm* — ConocoPhillips Company

(57) ABSTRACT

A method of introducing flue gas, from a flue stack in a steam-assisted production facility, into a heat exchanger. The flue gas comprises boiler combustion products selected from at least one of commercial pipeline gas and produced gas. The method begins by cooling a portion of the water vapor in the flue gas in the heat exchanger to produce flue gas water. This flue gas water is then collected and removed as make-up water.

17 Claims, 2 Drawing Sheets

US 8,430,947 B2

WATER RECOVERY FROM STEAM-ASSISTED PRODUCTION

CROSS-REFERENCE TO RELATED APPLICATIONS

None

STATEMENT REGARDING FEDERALLY SPONSORED RESEARCH OR DEVELOPMENT

None

FIELD OF THE INVENTION

A method for generating make-up water by recovering water from steam-assisted production.

BACKGROUND OF THE INVENTION

The make-up water supply for future steam-assisted heavy oil production is an area of critical concern. There is an ecological push for fresh or "non-saline" water to not be used but instead to use saline water, however typically saline water contains a high amount of total dissolved solids. The costs associated with treating a water stream with a high amount of dissolved solids can be very expensive.

Water recovery by condensation from commercial-size boiler flue gas streams is an idea that has been discussed for quite some time. Many industrial processes produce process streams containing condensable components such as water vapor. As the mere discarding of these condensable components can constitute a substantial loss in available heat energy, it is desirable to recover these condensable components from the process streams for economic reasons. It is also desirable to recover the latent heat of vaporization associated with such condensable components as a means for reducing process energy requirements. The use of heat exchanger-based condensers for the recovery of condensable components of process streams and the latent heat of vaporization associated therewith is well known to those skilled in the art.

Methods and apparatuses for the selective removal of one or more components from a gaseous mixture are well known. U.S. Pat. No. 4,875,908 teaches a process for selectively separating water vapor from a multi-component gaseous mixture in which the multi-component gaseous mixture comprising the water vapor is passed along and in contact with a membrane which is selectively permeable to water vapor. The use of membranes for selective removal of one or more components of a gaseous mixture is also taught by U.S. Pat. No. 4,583,996 (inorganic porous membrane), U.S. Pat. No. 3,980,605 (fibrous semi-permeable membrane) and U.S. Pat. No. 3,735,559 (sulfonated polyxylene oxide membranes).

Methods and apparatuses for selective removal of water vapor from a gaseous mixture and condensing the separated water vapor to recover its latent heat of vaporization are also known. U.S. Pat. No. 5,236,474 teaches a process for removing and recovering a condensable vapor from a gas stream by a membrane contactor in which a gas stream containing a condensable vapor is circulated on one side of hollow fiber membranes while cool extraction fluid is circulated on the other side under a total pressure differential. As a result, the condensable vapor in the gas stream is condensed in the gas stream and the condensed vapor, i.e. liquid, permeates the membrane and becomes entrained in the cool extraction fluid.

U.S. Pat. No. 4,466,202 teaches a process for recovery and reuse of heat contained in the wet exhaust gases emanating from a solids dryer or liquor concentrator by preferentially passing the vapor through a semi-permeable membrane, compressing the water or solvent vapor, and subsequently condensing the water or soluble vapor in a heat exchanger, thereby permitting recovery of its latent heat of vaporization for reuse in the evaporation process. It will be apparent to those skilled in the art that a substantial amount of energy will be required to compress the water or solvent vapor in accordance with the process of this patent. U.S. Pat. No. 5,071,451 teaches a vapor recovery system and process that permits condenser vent gas to be recirculated. The system includes a small auxiliary membrane module or set of modules installed across a pump and condenser on the downstream side of a main membrane unit, which module takes as its feed the vent gas from the condenser and returns a vapor-enriched stream upstream of the pump and condenser.

U.S. Pat. No. 7,066,396 teaches a heating system having a steam generator or water heater, at least one economizer, at least one condenser and at least one oxidant heater arranged in a manner so as to reduce the temperature and humidity of the exhaust gas stream and recover a major portion of the associated sensible and latent heat. The recovered heat is returned to the steam generator or water heater so as to increase the quantity of steam generated or water heated per quantity of fuel consumed. In addition, a portion of the water vapor produced by combustion of fuel is reclaimed for use as feed water, thereby reducing the make up water requirement for the system. However, U.S. Pat. No. 7,066,396 provides no teaching or suggestion of producing make-up water for a steam-assisted heavy oil production system while cleaning and neutralizing the flue gas prior to the heat recovery.

U.S. Pat. No. 4,799,941 teaches a method for condensing flue gas in combustion plants, and an arrangement of the apparatus. U.S. Pat. No. 4,799,941 attempts to condense flue gas in combustion plants by: (a) cooling and humidifying the flue gas by spraying water thereinto; (b) cooling and condensing water vapor from the flue gases in a first condensing stage, by indirect heat exchange with recirculated water, or return water, from a hot water circuit; (c) further cooling and condensing water vapour from the flue gases in a second condensing stage, by indirect heat exchange with water from a combustion air humidifier; and (d) heating and humidifying combustion air in the humidifier by direct contact with heated recirculated water from the second condensing stage. However, U.S. Pat. No. 4,799,941 provides no teaching or suggestion of producing make-up water for a steam-assisted heavy oil production system while cleaning and neutralizing the flue gas prior to the heat recovery.

SUMMARY OF THE INVENTION

The present embodiment depicts a method of introducing flue gas, from a flue stack in a steam-assisted production facility, into a heat exchanger. The flue gas comprises boiler combustion products selected from at least one of commercial pipeline gas and produced gas. The method begins by cooling a portion of the water vapor in the flue gas in the heat exchanger to produce flue gas water. This flue gas water is then collected and removed as make-up water.

The present embodiment also depicts a method which begins by collecting production fluids from a steam-assisted heavy oil operation. The production fluids are then separated into a produced gas stream, a produced oil stream and a produced water stream. The produced water stream is then transported to a boiler wherein the produced water stream is converted for use in a steam-assisted heavy oil operation. The produced gas stream is transported to the boiler wherein the produced gas stream is used a fuel source. The flue gas from the boiler is cooled in a heat exchanger to condense at least a portion of the water vapor in the flue gas. The condensed water vapor is then collected and transported to the boiler wherein the condensed water vapor is converted to use in the steam assisted heavy oil operation.

BRIEF DESCRIPTION OF THE DRAWINGS

The invention, together with further advantages thereof, may best be understood by reference to the following description taken in conjunction with the accompanying drawings.

DETAILED DESCRIPTION OF THE INVENTION

The present method provides a method of introducing flue gas, from a boiler flue stack in a steam-assisted heavy oil production facility, into a heat exchanger, wherein the boiler flue gas comprises boiler combustion products selected from at least one of commercial pipeline natural gas and produced gas from a steam-assisted heavy oil production facility. The first step involves condensing a portion of the water from the flue gas in the heat exchanger to produce a flue gas water stream. The flue gas water is then collected, removed, adjusted for pH to be compatible with other facility boiler water, and used as boiler make-up water.

Examples of steam-assisted operation methods applicable to this method include steam-assisted gravity drainage, steam-assisted heavy oil operation and cyclical steam stimulation.

The present method has the ability to produce a significant portion of the water used in the steam-assisted heavy oil facility as make-up water, such as at least 10%, 15%, 20%, 25%, 30%, 35%, 40%, 45% or even 50% of that water depending on the water balance in the system. Both environmental and financial benefits can be achieved by recycling the water used in a steam-assisted heavy oil production facility. It is preferred that the recovered water produced from the flue gas is compatible with the make-up water in the rest of the facility. This could require pH adjustment to the range of 8-10 pH with neutralizing chemicals such as: sodium hydroxide, calcium hydroxide, potassium hydroxide, ammonia, ammonium hydroxide, sodium bicarbonate, and sodium carbonate. In alternate embodiments the neutralizing chemical would bring the pH to a target range of 3.0 to 7.0 or even between 3.0 and 4.5.

Figure 2:
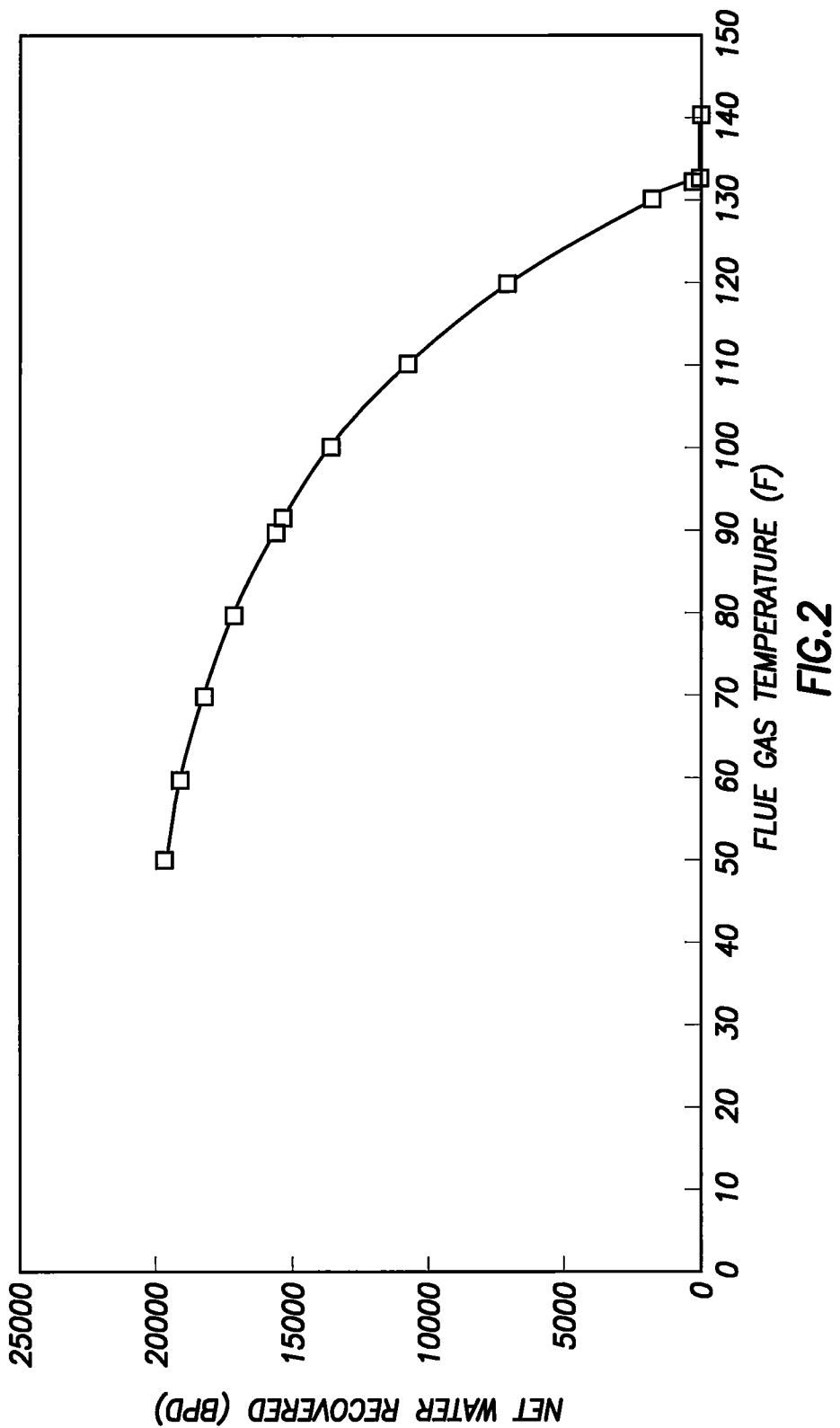
FIG. 2 depicts the relationship between flue gas temperature and net water recovery for a typical commercial steam-assisted heavy oil production facility.

In one embodiment the heat exchanger is cooled by air forced through the inside of tubes where the flue gas is cooled on the outside of the tubes. In another embodiment the heat exchanger is cooled by air on forced around the outside of tubes where the flue gas is cooled on the inside of the tubes. The temperature of the air expelled by the heat exchanger in either embodiment needs to be lower than the water dew point of the flue gas, approximately 135° F., and sufficient to cool the flue gas to produce the desired amount of recovered water as shown in FIG. 2. If ambient air is used for cooling the heat exchanger, the size of the heat exchanger needs to be optimized for the amount of make-up water needed, so that sufficient water can to be provided to the facility as the temperature changes throughout the year.

In yet another embodiment the heat exchanger is cooled by circulating a glycol-water stream, or any other conventional solution that would lower the water freezing point, through a tube inside the heat exchanger and the flue gas cooled on the outside of the tubes. In this embodiment the glycol-water stream would be cooled externally by another heat exchanger such as an air-cooler and recirculated back to the main flue gas heat exchanger. The concentration of glycol in this stream can be from 0 to 80 wt %, preferably 40 to 60 wt % for maximum freeze protection. The glycol-water temperature needs to be lower than the water dew point of the flue gas, approximately 135° F., and sufficient to cool the flue gas to produce the desired amount of recovered water as shown in FIG. 2. If ambient air is used to cool the glycol-water mixture then the glycol-water temperature will vary throughout the year and the equipment sizing of the heat exchangers needs to be optimized for the amount of make-up water to be provided to the facility throughout the year.

The commercial pipeline natural gas and produced gas can be varied depending on how much gas is produced in the steam-assisted heavy oil production reservoir operation. Mixtures can be 0 to 100 vol % pipeline natural gas and 0 to 100 vol % produced gas. It is preferable to burn all the produced gas in order to lower the costs for purchasing a sufficient volume of pipeline natural gas to operate the boiler systems. A typical range of mixtures consists of 30 to 70 vol % produced gas.

In one embodiment the boiler flue gas has minimal sulfur content to reduce the corrosivity of the recirculating and recovered water. Minimal sulfur content can be achieved by any process currently known in the art. In one embodiment minimal sulfur content is achieved by chemically treating the flue gas prior to combustion. Examples of chemicals that can used to treat the flue gas include but are not limited to chemical solvents, physical solvents and solid adsorbents. Representative examples of chemical solvents include amines such as monoethanolamine and methyldiethanolamine. Representative examples of physical solvents include methanol and dimethyl ethers of polyethylene glycol. Representative examples of solid absorbents include zinc oxide.

The practice of burning produced steam-assisted heavy oil production reservoir gas is quite commonly done for economic reasons but can introduce more sulfur contaminant into the boiler fuel, which makes the flue gas stream more acidic and corrosive due to the presence of sulfur dioxide and sulfur trioxide. Because these latter two species can also be absorbed in water and make it corrosive, this makes the condensation of flue gas vapors from steam-assisted heavy oil production boilers a unique application not practiced in the present art.

Another type of chemical additive that can be utilized is hydrogen peroxide. Hydrogen peroxide can be used to remove sulfur dioxide, nitrogen dioxide and other contaminants from flue gas. The use of hydrogen peroxide converts the oxide of sulfur and some of the oxide of nitrogen to more stable oxidation states. Acids formed as a result of this conversion, namely sulfuric acid ($H_2SO_4$) and nitric acid ($HNO_3$), can then be neutralized with base, such as limestone or $CaCO_3$, in an isolated area or enclosure away from populated areas. Other known ways to neutralize the acid include using gas desulfurization techniques such as wet lime treatment or wet $NaHCO_3$ treatment. Alternatively, depending on the demand and purity of the acid products themselves, the sulfuric and nitric acids can be collected and processed for sale as an industrial product, enhancing the economic feasibility of the present system. The following simplified chemical reactions represent the processes involved in both the creation of the contaminants and their removal through the use of hydrogen peroxide:

$$S+O_2 \leftrightarrows SO_2$$

$$N_2+O_2 \leftrightarrows 2NO$$

$$2NO+O_2 \leftrightarrows 2NO_2$$

$$H_2O_2+SO_2 \leftrightarrows H_2SO_4$$

$$H_2O_2+2NO_2 \leftrightarrows 2HNO_3$$

$$H_2SO_4+H_2O+CaCO_3 \rightarrow CaSO_4.2H_2O+CO_2$$

$$2HNO_3+CaCO_3 \rightarrow Ca(NO_3)_2+H_2O+CO_2$$

By reducing the sulfur species from the natural gas, the corrosivity of the make-up water will be reduced. In addition to the methods described above a method can be performed using a majority pipeline natural gas for specific steam-assisted heavy oil production boilers. This will also reduce the sulfur impurities and reduce the corrosivity of the recovered water. A further reduction of sulfur can be achieved by using natural gas before it is odorized with sulfur compounds.

In another embodiment the combusted flue gas is pre-cooled with a water spray which is injected directly into the ducting before the heat exchanger to achieve a temperature above the dew point of the flue gas, approximately 135° F., but below the condensation temperature of sulfur trioxide in flue gas, approximately 210-250° F. In this embodiment the water spray can contain a combusted flue gas neutralizing chemical. Representative examples of flue gas neutralizing chemicals include: sodium hydroxide, calcium hydroxide, potassium hydroxide, ammonium hydroxide, sodium bicarbonate, and sodium carbonate.

In one embodiment the temperature of the temperature of the flue gas would be 90° F. Although it is possible to still have recovery of water from flue gas anywhere from 50° F. up to 135° F. for operability, it is ideal that the temperature of the flue gas would be between 80° F. to 110° F.

Figure 1:
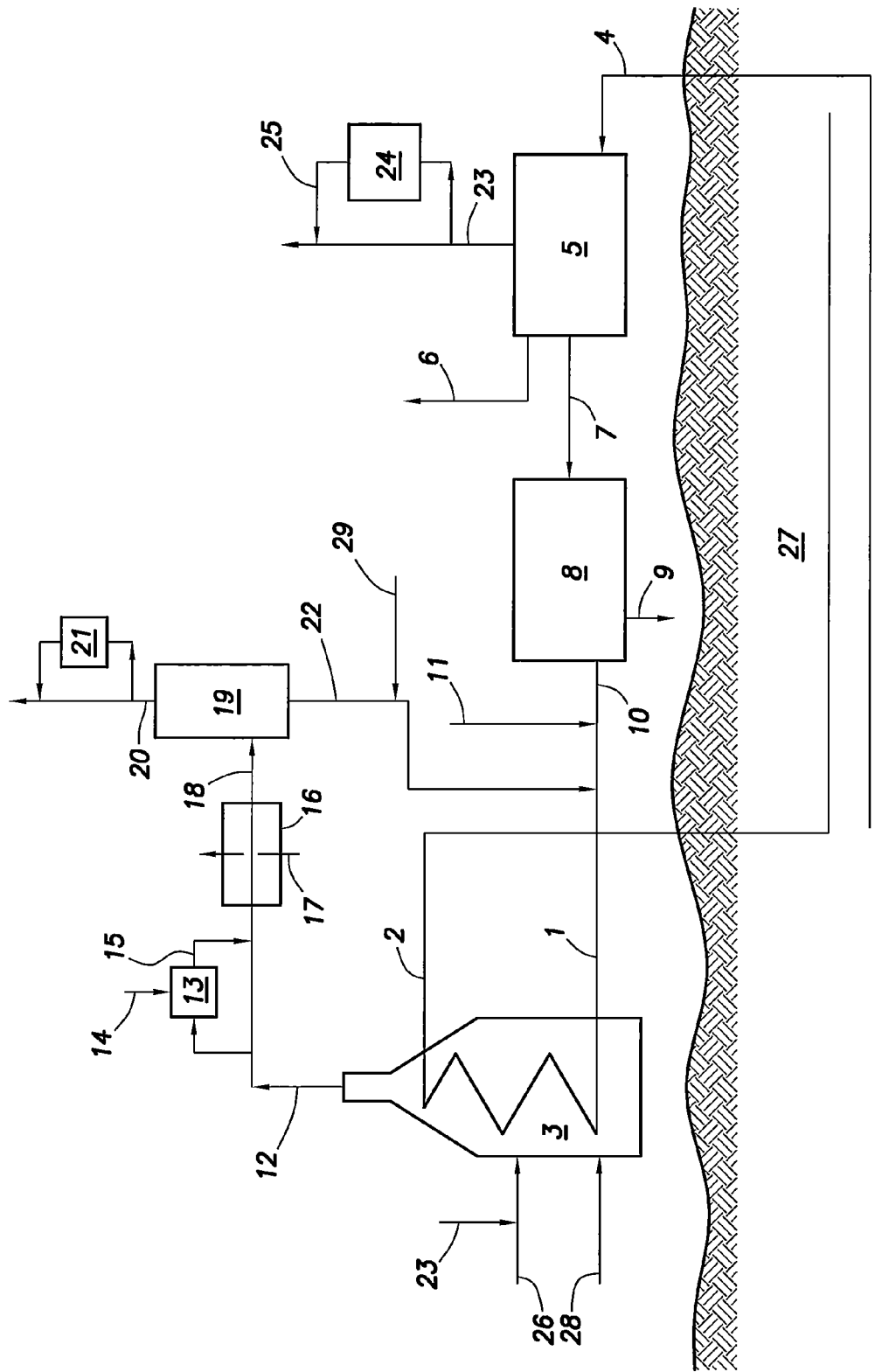
FIG. 1 depicts a steam-assisted heavy oil production facility capable of recovering make-up water from flue gas.

FIG. 1 depicts an embodiment of the present invention for recovering make-up water for a steam-assisted heavy oil production facility from its boiler flue gas. A water stream 1 is converted to steam 2 in a boiler system 3 which burns at least one of commercial pipeline natural gas, 26 and produced gas 23 with air 28. The produced gas 23 which is detailed further below, can be a combination of cleaned produced gas 25 or standard produced gas. The steam 2 is injected underground into a heavy oil or bitumen-containing reservoir 27 and a product mixture 4 of bitumen, water and/or gas is collected and brought to the surface. This product mixture 4 is sent to a separation facility 5 which separates the product mixture 4 into a bitumen 6, a water 7, and produced gas 23. The bitumen 6 may have diluent added to it in the separation facility 5 to assist in the separation. The water stream 7 is sent to a water treatment facility 8 to make it suitable for return to the boiler. Any known process currently known can be used for this water treatment. Typically, a purge stream 9 that is high in contaminants, is removed during water treatment and to produce a water stream 10 available for recycle to the boiler. To balance the loss of water in the purge stream 9 and elsewhere in the heavy oil production system, make-up water is required. This is made up of either a natural or conventional water resources stream 11 and/or recovered water stream 22 which is detailed further below. The combined make-up water streams 10, 11, and 22 return to the boiler system 3 as water stream 1.

The flue gas 12 exits the boiler system at approximately 300-400° F. and is normally vented to the atmosphere. The flue gas 12 may be pre-cooled by injecting a water stream 14 into the flue gas 12 via an injection device 13. This water stream may contain a flue gas neutralizing chemical. The resultant stream 15 would have a temperature below the condensation point of sulfuric acid in the flue gas or the acid gas dew point due to sulfur trioxide condensation in a system that contains water but above the dew point of the flue gas, approximately 135° F. The flue gas stream is cooled in a heat exchanger 16, by a cooling stream 17 such that a portion of the water vapor in the flue gas condenses. The cooling stream can be either ambient air or a glycol-water mixture that is externally cooled by an ambient air or water source. The exiting stream 18 will be a two-phase mixture of condensed flue gas water and the remaining flue gas. This stream is sent to a two-phase separation vessel 19, such as a knock-out pot wherein the cooled flue gas exits as stream 20. This stream may have an induced draft fan, 21, to pull the flue gas through the equipment. Optionally a blower may be used on the flue gas stream at any point further upstream. A fan or blower may not be necessary in either location if the boiler system's fan which supplies air 28 provides adequate pressure. The recovered water stream 22 exits the two-phase separation vessel 19. This stream 22 can be used to reduce, if not eliminate the make-up water stream 11 derived from natural resources. If the water is too acidic for either corrosion considerations in the piping and equipment or for mixing with the water treatment effluent, a neutralizing chemical in stream 29 can be added.

The produced gas 23 from the separation facility is combustible and can be burned in the boiler 3. This produced gas stream can be used to reduce the amount of commercial pipeline natural gas 26 used in the boiler. Because the produced gas 23 contains sulfur and other impurities the produced gas 23 may be sent to a gas treatment facility 24 to remove sulfur and other impurities resulting in cleaned produced gas 25 which can be sent to the boiler instead of or in addition to the produced gas 23. The use of the gas treatment facility 24 is capable of lowering emissions from the boiler system 3 in addition to reducing the corrosivity of the flue gas 12, the recovered water stream 22 and corrosion in equipment and its associated piping.

FIG. 2 depicts a graph describing the amount of make-up water that can be obtained from a 90,000 bpd steam-assisted heavy oil production facility operating at a 2.5:1 steam:oil ratio with flue gas stream conditions of 960MMSCFD flue gas at 10.5 wt % $H_2O$, 14.1 psia and 300° F. It can be shown from this table that there is a correlation between the amount of water recovered and the temperature of the flue gas.

Using the example steam-assisted heavy oil production facility from FIG. 1 it can be shown that approximately 225,000 bpd water are needed for the facility to operate (90,000 bpd oil×2.5 steam/oil ratio=225,000 bpd water). Assuming a 93% recovery of the steam-assisted heavy oil production water injected downhole and retained by the water treatment system after the water treatment purge stream, this means that approximately 15,750 bpd of make-up water is needed to keep the steam-assisted heavy oil production facility operating (225,000 bpd water needed×(1-0.93)=15,750 bpd make up water). In FIG. 2, when the flue gas is cooled to 90° F., 16,000 bpd of make-up water can be recovered from the flue gas. Therefore under ideal conditions it is possible that completely all of the make-up water needed in a steam-assisted heavy oil production facility can be supplied by the present method. Cooling the flue gas below 90° F., such as when the ambient air temperature is below the design temperature, produces an excess of recovered water stream 22, while cooling the flue gas above 90° F. with warmer ambient air temperatures produce a good portion of the make-up water.

The preferred embodiment of the present invention has been disclosed and illustrated. However, the invention is intended to be as broad as defined in the claims below. Those skilled in the art may be able to study the preferred embodiments and identify other ways to practice the invention that are not exactly as described herein. It is the intent of the inventors that variations and equivalents of the invention are within the scope of the claims below and the description, abstract and drawings are not to be used to limit the scope of the invention.

The invention claimed is:

1. A method comprising:
   a) introducing flue gas, from a flue stack in a steam-assisted heavy oil production facility, into a heat exchanger, wherein the flue gas comprises boiler combustion products selected from at least one of commercial pipeline natural gas and produced gas;
   b) cooling the flue gas in the heat exchanger to produce a flue gas water; and
   c) collecting and removing the flue gas water to produce make-up water, wherein a neutralizing chemical brings the make-up water produced to a pH between 3.0 and 4.5.

2. The method of claim 1, wherein the heat exchanger is cooled by circulating air through a tube inside the heat exchanger.

3. The method of claim 1, wherein the heat exchanger is cooled by circulating a glycol-water stream through a tube inside the heat exchanger.

4. The method of claim 1, wherein the heat exchanger is cooled by circulating air on the outside of the heat exchanger.

5. The method of claim 1, wherein the flue gas is produced from the combustion of a fuel gas with minimal sulfur content.

6. The method of claim 5, wherein the fuel gas with minimal sulfur content is achieved by chemically treating the fuel gas prior to combustion.

7. The method of claim 5 wherein the fuel gas is treated with at least one chemical comprising of: chemical solvents, physical solvents and solid adsorbents.

8. The method of claim 7, wherein the chemical solvent is selected from the group consisting of: monoethanolamine and methyldiethanolamine.

9. The method of claim 7, wherein the physical solvent is selected from the group consisting of methanol and dimethyl ethers of polyethylene glycol.

10. The method of claim 7, wherein the solid absorbent is selected from the group consisting of zinc oxide.

11. The method of claim 1, wherein the flue gas is cooled with a water spray injected directly into the ducting to a temperature above the water dew point of the flue gas but below the condensation temperature of sulfur trioxide in flue gas.

12. The method of claim 11, wherein the water spray contains the neutralizing chemical.

13. The method of claim 12, wherein the neutralizing chemical is selected from the group consisting of: sodium hydroxide, calcium hydroxide, potassium hydroxide, ammonium hydroxide, sodium bicarbonate, and sodium carbonate.

14. The method of claim 1, wherein the neutralizing chemical is added to the flue gas before it enters the heat exchanger.

15. The method of claim 12, wherein the neutralizing chemical consists of ammonia.

16. The method of claim 1, wherein more than 50% of the water used in the steam-assisted heavy oil production facility is make-up water.

17. A method comprising:
   a) collecting production fluids from a steam-assisted heavy oil operation;
   b) separating the production fluids into a produced gas stream, a produced oil stream and a produced water stream;
   c) transporting the produced water stream to a boiler wherein the produced water stream is converted for use in the steam-assisted heavy oil operation;
   d) transporting the produced gas stream to the boiler, wherein the produced gas stream is used as a fuel source;
   e) cooling the flue gas from the boiler in a heat exchanger to condense at least a portion of the water vapor in the flue gas; and
   f) collecting the condensed water vapor and transporting the condensed water vapor to a boiler wherein the condensed water vapor is converted to use in the steam-assisted heavy oil operation, wherein a neutralizing chemical brings the condensed water vapor to a pH between 3.0 and 4.5.

* * * * *